United States Patent Office 2,897,572
Patented Aug. 4, 1959

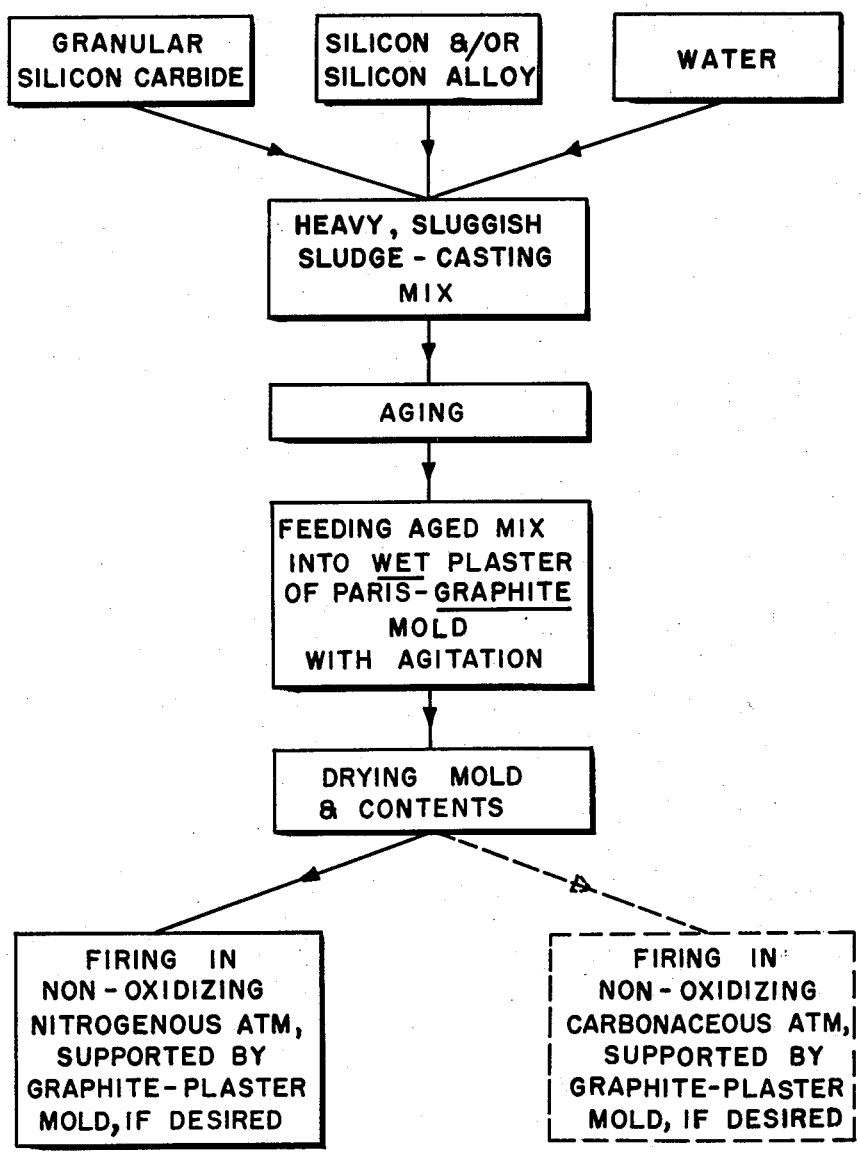

2,897,572

REFRACTORY BODIES AND METHOD OF MAKING THE SAME

George R. Hansen, Nixon, N.J., assignor to The Carborundum Company, Niagara Falls, N.Y., a corporation of Delaware Application January 28, 1955, Serial No. 484,847

8 Claims. (Cl. 25—156)

This invention relates to new and improved bonded silicon carbide articles of manufacture and to a novel method for making them.

Bonded silicon carbide bodies have been known and used for many years. A number of different materials have been used to bond the grains or particles of silicon carbide together to form the desired shape, such as clays and glass-forming mixtures of various composition to form conventional ceramic and vitreous bonded shapes, pitch and other tarry matter to form coke-residue bonded bodies, and more recently, silicon and silicon alloys fired under proper conditions so as to react with constituents of the ambient atmosphere to form refractory nitride and/or carbide bonds. The bonded silicon carbide bodies obtained with these various prior art bonding compositions and methods have been satisfactorily used for many purposes, especially in the refractory field. However, regardless of the type of product heretofore provided, each specific one has had its own particular disadvantages and limitations of use. For example, the coke-residue bonded articles have been unduly susceptible to oxidation at elevated temperatures, and the vitreous-bonded and clay-bonded articles have shown a tendency at higher temperatures to soften and lose their strength with loss of desirable load-bearing ability. Those silicon carbide bodies bonded by means of silicon nitride and silicon carbide derived from silicon or silicon alloys have been shown to have exceptionally high strengths at high temperatures and also good load-bearing properties at elevated temperatures. However, such bodies in certain applications wherein they have been subjected to severe or rapid fluctuations of temperature have not been entirely satisfactory and have failed due to cracking from heat shock.

Furthermore, the molding techniques employed in the making of bonded silicon carbide bodies, and particularly those of complex or intricate shape, have been subject to various limitations. For instance, while the clay-containing mixes due to the plastic nature of the bond constituents, lend themselves fairly well to the formation of shapes by the conventional methods of slip-casting from thin slip-casting slurries, the resulting bodies do not have the requisite properties for some high temperature service conditions. In fact, such bodies when made by normal slip-casting operations have been inferior to bodies of the same composition formed by pressure molding. On the other hand, the more refractory bodies composed of non-plastic bonding constituents, such as those derived from silicon and silicon alloys, are not adaptable to normal slip-casting operations and as a result the manufacture of such bonded bodies has heretofore been restricted to the simpler shapes which can be fabricated by conventional pressure molding.

It is an object of the present invention to provide a new bonded silicon carbide body having improved properties.

It is a further object to provide bonded silicon carbide articles having high resistance to heat shock.

It is a still further object to provide a novel method of making bonded silicon carbide bodies having uniform body structure and improved properties, and particularly bodies of intricate or complex shape, from non-plastic compositions of the aforesaid type.

These and other objects will become apparent as the description proceeds.

In accordance with the present invention bonded silicon carbide bodies of marked uniformity of body structure and outstanding resistance to heat shock have been made by a novel sludge-casting process that can be briefly described as follows: The raw batch ingredients consisting of granular silicon carbide, and a silicon-based material such as finely divided silicon and/or silicon alloy, and usually a small amount of a temporary binder and/or a deflocculant, are intimately mixed after which water is added in sufficient amount to bring the material to the consistency of a heavy, sluggish sludge. This wet, heavy sludge is then aged, preferably in a covered container, for a period of two to eight days prior to use. The aged mass is then fed into a wet graphite-plaster of Paris mold while the mix and the mold are simultaneously subjected to mechanical vibration which brings about a flow of the mix into the outermost corners and cavities of the mold and compacts the material to a dense, uniform structure. The mold and contents, after a suitable period of agitation by mechanical vibration, are placed in a drying oven and the mold and contents dried. The cast and dried shape is then placed in a furnace chamber and fired in a non-oxidizing nitrogenous atmosphere, such as an atmosphere of nitrogen or ammonia, preferably while still supported by all or part of the mold, whereupon the silicon and/or silicon alloy reacts with the nitrogen of the ambient atmosphere to form a silicon nitride bond. In order to further assure that the atmosphere will be fully non-oxidizing in character during the firing step, the usual practice is to surround the shapes while they are being fired with a carbonaceous packing material such as a mixture of fine graphite and coarse fragments or pieces of graphite. During the firing of the article and mold, when it is used to support the article during firing, gradually disintegrates to the extent that it is readily separated from the fired article at the conclusion of the firing process although it holds together during the firing process sufficiently to provide a satisfactory support for the article during most of the firing process. It is also noted that the cast article in the course of firing does not undergo perceptible change in size by either expansion or shrinkage so that as a result the article can be cast to certain desired final dimensions directly with the maintenance of unusually close dimensional tolerances.

According to a modified form of the present process the molded article, with or without the supporting mold structure, after being formed in the manner already described, can be fired in a non-oxidizing, carbonaceous atmosphere such as an atmosphere of carbon monoxide, or in a non-oxidizing atmosphere containing both nitrogenous and carbonaceous components whereupon the carbon oxide gases of the ambient atmosphere, or the carbon oxide gases and nitrogen together of the ambient atmosphere, react with the silicon and/or silicon alloy of the bond to form an ultimate interstitial bond of silicon carbide or silicon carbide and silicon nitride in combination, depending upon the absence or presence of nitrogen or nitrogen-yielding constituents in the atmosphere. The silicon carbide thusly formed within the body of the article is of the cubic crystalline habit and, with or without the silicon nitride as the case may be, forms an interstitial bonding matrix for the granular silicon carbide constituting the major component of the body.

The steps of the process of this invention are shown in the form of a flow sheet in the drawing.

Preparation of sludge-casting mix

MIX NO. 1

| | |
|---|---:|
| Silicon carbide, 10 mesh and finer _____lbs__ | 70 |
| Silicon carbide fines _____lbs__ | 10 |
| Ferromanganese silicon, 200 mesh _____lbs__ | 10 |
| Silicon, 200 mesh _____lbs__ | 10 |
| Bentonite _____lbs__ | 0.5 |
| Water _____cc__ | 4800 |
| Dextrine _____lbs__ | 0.24 |
| Lithium citrate, 20% aqueous solution _____cc__ | 520 |

MIX NO. 2

| | |
|---|---:|
| Silicon carbide, 10 mesh and finer _____lbs__ | 75 |
| Silicon carbide fines _____lbs__ | 10 |
| Silicon, 200 mesh _____lbs__ | 15 |
| Bentonite _____lbs__ | 0.5 |
| Water _____cc__ | 4800 |
| Dextrine _____lbs__ | 0.24 |
| Lithium citrate, 20% aqueous solution _____cc__ | 520 |

Using either one of the two mixes set forth above, all the ingredients except the water and lithium citrate are mixed dry to form an intimate mixture after which the water and lithium citrate are added, either separately or together, and mixed for approximately ten minutes. The resulting wet mix is then left in the mixer or transferred to a container and covered over with a wet burlap bag or otherwise protected against undue evaporation of water from the mix and allowed to age for between two and eight days before use. It has been found that where such mixes have been allowed to stand for several days and the mix allowed to lose too much of its moisture it will not satisfactorily cast and it must be reconditioned by the addition of water to re-wet the mix, followed by remixing.

The sludge-casting mix should always be aged to get the maximum density and uniformity of body structure in the formed article, as is customarily desired for most purposes. However, for the few occasions where it is not essential to provide optimum density in the finished piece and a more porous, permeable structure can be tolerated for the use in mind, it has been found that the aging step can be eliminated and the unaged mix cast and released from the mold, although the resulting body is less dense and has a more porous and more permeable appearance.

It is not desired to be limited to the specific mixes set forth above since satisfactory results have been obtained using finer grit size silicon carbide than the 10 mesh and finer material specified in the above mixes. It is also possible to use other proportions of ingredients without departing from the spirit of the invention.

In the two specific mixes set forth above, the lithium citrate solution acts as a deflocculating agent and the dextrine serves not only as an added deflocculant but to some extent performs as a temporary binder to give the body sufficient "green" strength for handling before firing. Other deflocculants and/or temporary binders that are well known in the trade can be similarly used, or the defluocculant and/or temporary binder can be eliminated without departing from the scope of the present invention. For example, although it is usually desirable to use a small amount of a temporary binder to lend handling strength to the unfired body, such temporary binder can be dispensed with in some cases such as when the formed article is to be fired prior to its removal from the mold.

Molds

The molds used for carrying out the present process are made of a combination of plaster and graphite with or without the use of other filler materials such as sand, crushed mold residue, or walnut shells. The graphite content of the mold mix has been found to be advantageous to the release of the mold from the cast article, separation being much easier than in the case of straight plaster molds where it would be practically impossible to satisfactorily separate the two. Satisfactory molds and cores have been made from the following compositions:

| Mold Mix No. | 1 | 2 | 3 | 4 |
|---|---|---|---|---|
| Mold ingredients, percent by weight: | | | | |
| Pottery plaster | 50 | 67 | 50 | 67 |
| Powdered graphite | 50 | 33 | 25 | 15 |
| Sand | | | 20 | 10 |
| Walnut shells | | | 5 | 8 |

The amount of water may vary somewhat with different grades of plaster, but it should be somewhere in the neighborhood of 50% water and 50% plaster and graphite mixture by weight. The correct amount of water is placed in the container and the plaster and graphite mixture is sprinkled in gradually until all the dry mix has been added. The mixture is then mixed with a high-speed mixer for a very short period of time such as a half minute. The mixture is then immediately cast around the pattern or model to form the desired mold. The model is first coated with a parting medium such as "Vos XX"[1] Special Oil Soap solution or a paste wax in order to provide a means of separation of the mold from the pattern after setting. The molds are ready for use as soon as the plaster has set up since the moisture contained in the mold body serves to prevent an excessively rapid extraction of moisture from the cast body when the mold is used. When the water is withdrawn from the mold contents too rapidly the resulting cast article does not have a homogeneous structure. Actually, if the mold is made and allowed to stand any substantial period of time prior to use such as longer than one day it should be re-wet in order to partially fill the pores with moisture prior to use.

Sludge-casting technique

The properly aged mix is placed on a vibrator and vibrated for approximately ½ hour immediately before using. While the mix is being vibrated it should be continually turned over and mixed with a trowel. This is done to render the mix completely homogeneous and also serves as a means of determining whether the mix has been sufficiently aged. If free water forms upon the top of the mix during this preliminary vibrating stage it is an indication that the mix is not homogeneous and should be further aged before casting. Although the casting mix is invariably of a heavy, sluggish sludge-like nature the consistency of the casting body can vary to some extent depending upon the particular shape to be cast. For instance, thicker sections can use a much stiffer mix than the thinner-walled more intricate shapes. However, in no case should the mix be used if it is found to have free water on the surface of the mix as a result of the preliminary vibrating operation.

The wet plaster-graphite molds are either clamped or held together by rubber bands and placed on the vibrating table and the mix fed into the mold cavity by means of a filling chute. The filling chute is rested upon a block or other support that will transmit vibrations to the mix passing from the chute to the mold. Very satisfactory results have been obtained by placing the entire mix container on the vibrating table during the filling of the mold so that the entire mass is subjected to constant vibration so as to keep the material agitated and conditioned for use, but a vibrating feeder is usually found preferable. It might be noted that the casting mass is of sufficient stiffness or sluggishness that it does not flow until subjected to some form of vigorous agitation or mechanical vibration.

---

[1] Scott-Stadell Supply Co., 1358 Main Street, Buffalo, N.Y.

After the mold is completely filled with a slight surplus to allow for shrinkage the mold is left on the vibrator and allowed to vibrate at a lower frequency for a short period of time in order to further compact the mold contents. During this period, small increments of additional casting mix can be added at the entrance to the mold cavity in order to fill voids and replace any water absorbed by the mold. When no more material will go into the mold the top can be struck off with a trowel and the mold placed in a drier and dried at 140° F. overnight. After drying, the mold can be removed from the cast shape if desired. This is done by tapping the mold lightly just enough to break the contact between the mold and the piece. However, most satisfactory results are obtained by leaving the mold on the cast shape or at least a part of the mold on the cast shape to provide support and placing both in the kiln for firing.

*Firing operation*

The cast article, usually supported by at least a part of the mold structure, is placed in a suitable kiln or furnace chamber and fired in a non-oxidizing nitrogenous atmosphere at a temperature of 1400° C. to 1450° C., the furnace being held at peak temperature for a period of several hours in order to allow time for completion of the reaction between the nitrogen introduced and the silicon and/or silicon alloy to form a silicon nitride or silicon nitride-containing bond for the silicon carbide particles. The temperature limits may be above and below those indicated. It has been found desirable to surround the articles in the kiln or furnace chamber with a sufficient amount of carbon to take up any oxygen which might otherwise serve to react with the cast piece during firing.

As already pointed out, instead of firing the molded and dried shape in an atmosphere of nitrogen or in a nitrogen-generating atmosphere such as an atmosphere of ammonia, the article can be fired in a non-oxidizing carbonaceous atmosphere, such as an atmosphere of carbon monoxide whereupon the carbon oxide reacts with the silicon and/or silicon alloy bonding components to form a silicon carbide of cubic crystalline habit which serves to bond the granular silicon carbide of the body together.

As has been herein described, the granular silicon carbide of the articles is held together by a bond of silicon nitride and/or silicon carbide, depending upon the specific character of the non-oxidizing ambient atmosphere within the firing chamber and the conditions of the firing step. Generically speaking, these various bonding ingredients, namely, silicon carbide and silicon nitride, can be otherwise referred to as silicides of carbon and nitrogen, or, in other words, as non-metallic silicides.

The resulting sludge-cast silicon carbide articles are characterized by having an extremely smooth, dense surface appearance characteristic of articles formed by wet casting and also have extremely uniform, dense body structures throughout. Sludge-cast silicon carbide articles of the herein-described type are also highly resistant to fracture when subjected to extreme fluctuations in temperature. This resistance to breakage by heat shock is an entirely unexpected property which contributes greatly to the value of the material for certain high temperature applications where extreme fluctuations of temperature are encountered.

The material also has a bell-like ring when struck with a piece of metal. Since the overall density of the cast bodies is usually slightly lower than pressed bodies of similar composition, this soundness of body is believed to be due to the extremely uniform density throughout the piece and is responsible at least in part for the high heat shock resistance. In several tests where articles of the present invention have been compared directly with otherwise molded or pressed shapes of similar composition it has been shown repeatedly that the heat shock resistance of the present bodies is anywhere from two to three times as good as shapes made by conventional prior art methods. This comparison is based on the number of cycles to which the two different materials can be exposed to extreme heat shock before cracking appears.

The herein-described process has extended the field of use of silicone carbide into numerous applications in which it has never been found practical because of the inability heretofore to fabricate articles of silicon carbide, and especially those of complexity of shape, having the requisite density and homogeneity of body structure, the close dimensional tolerances, resistance to heat shock and/or corrosive conditions, and/or dimensional stability in use, all of which are made possible and obtained with bodies made in accordance with the present process. For example, one of the outstanding uses for silicon carbide which has been developed as a result of the present process and resulting body is the use of silicon nitride-bonded silicon carbide cast bodies as herein made for brazing fixtures for the support of metal shapes, especially those of intricate contour, such as stator and rotor blades for turbine engines and the like, when those articles are subjected to heat treatment for brazing together of composite parts, annealing or other heat treating processes wherein the article must be fully supported during the high temperature processing so as to prevent distortion or warpage of the piece or pieces during the heating operation. Satisfactory performance for such usage requires not only refractoriness and high resistance to heat shock but also fabrication to close dimensional tolerances and high dimensional and shape stability of the body during its entire period of use. The present bodies have served to replace the stainless steel brazing fixtures heretofore used for the purpose and have not only resulted in outstanding performance but at a fraction of the previous cost.

Bodies of the present invention have also been found to be highly satisfactory for use in handling molten metals such as for pump impellers and linings and other parts required for die-casting of molten aluminum, sinker rolls in metal-cladding operations and the like.

Having described the invention, it is desired to claim:

1. A method of making bonded silicon carbide articles of manufacture comprising preparing an intimate raw batch mixture comprising granular silicon carbide, and a silicon-based material, moistening said raw batch mixture with further mixing to bring it to the consistency of a sluggish mass, aging the mass, feeding the aged raw batch of material into a wet plaster-graphite mold containing at least 15% by weight graphite and containing free water comparable in amount to that present in the mold body immediately after the mold body has been hydrated to set condition while subjected to mechanical vibration, drying said mold and contents, and firing the molded article in a non-oxidizing, nitrogenous atmosphere.

2. A method of making bonded silicon carbide articles of manufacture comprising preparing an intimate raw batch mixture comprising granular silicon carbide, and a silicon-based material, adding water and mixing to form a heavy, sluggish mass, aging the mass for a period of two to eight days while it is maintained in a moistened condition, feeding the aged material into a wet plaster-graphite mold containing at least 15% by weight graphite and containing free water comparable in amount to that present in the mold body immediately after the mold body has been hydrated to set condition, agitating the mix and mold during the feeding operation, drying said mold and contents, and firing the molded article in a non-oxidizing, nitrogenous atmosphere.

3. A method of making bonded silicon carbide articles of manufacture comprising preparing an intimate raw batch mixture comprising granular silicon carbide, and a silicon-based material, moistening said raw batch mixture with further mixing to bring it to the consistency of a sluggish mass, aging the mass, feeding the aged raw batch of material into a wet plaster-graphite mold containing at least 15% by weight graphite and containing free water comparable in amount to that present in the mold body immediately after the mold body has been hydrated to set condition, subjecting the mold and contents to mechanical vibration, drying said mold and contents, and firing the molded article while supported by at least one part of said mold in a non-oxidizing, nitrogenous atmosphere.

4. A method of making bonded silicon carbide articles of manufacture comprising preparing an intimate raw batch mixture comprising granular silicon carbide, and a silicon-based material, moistening said raw batch mixture with further mixing to bring it to the consistency of a sluggish mass, aging the mass, feeding the aged raw batch of material into a wet plaster-graphite mold containing at least 15% by weight graphite and containing free water comparable in amount to that present in the mold body immediately after the mold body has been hydrated to set condition, subjecting the mold and contents to mechanical vibration, drying said mold and contents, and firing the molded article at a temperature of 1400° C. to 1450° C. in a non-oxidizing, nitrogenous atmosphere.

5. A method of making bonded silicon carbide articles of manufacture comprising preparing an intimate raw batch mixture comprising granular silicon carbide, and a silicon-based material, adding water and mixing to form a heavy, sluggish mass, aging the mass for a period of two to eight days while it is maintained in a moistened condition, feeding the aged material into a wet plaster-graphite mold containing at least 15% by weight graphite and containing free water comparable in amount to that present in the mold body immediately after the mold body has been hydrated to set condition, agitating the mix and mold during the feeding operation, drying said mold and contents, and firing the molded article in a non-oxidizing, carbonaceous atmosphere.

6. A method of making bonded silicon carbide articles of manufacture comprising preparing an intimate raw batch mixture comprising granular silicon carbide, and a silicon-based material, adding water and mixing to form a heavy, sluggish mass, aging the mass for a period of two to eight days while it is maintained in a moistened condition, feeding the aged material into a wet plaster-graphite mold containing at least 15% by weight graphite and containing free water comparable in amount to that present in the mold body immediately after the mold body has been hydrated to set condition, agitating the mix and mold during the feeding operation, drying said mold and contents, and firing the molded article in a non-oxidizing, atmosphere consisting essentially of nitrogenous and carbonaceous constituents.

7. A method of making bonded silicon carbide articles of manufacture comprising preparing an intimate raw batch mixture comprising granular silicon carbide, and a silicon-based material, adding water and mixing to form a heavy, sluggish mass, aging the mass for a period of two to eight days while it is maintained in a moistened condition, feeding the aged material into a wet plaster-graphite mold containing at least 15% by weight graphite and containing free water comparable in amount to that present in the mold body immediately after the mold body has been hydrated to set condition, agitating the mix and mold during the feeding operation, drying said mold and contents, and firing the molded article in a non-oxidizing, atmosphere which with silicon will form a silicide.

8. A method of making bonded silicon carbide articles of manufacture comprising preparing an intimate raw batch mixture comprising granular silicon carbide, and a silicon-based material, adding water and mixing to form a heavy, sluggish mass, feeding the material into a wet plaster-graphite mold containing at least 15% by weight graphite and containing free water comparable in amount to that present in the mold body immediately after the mold body has been hydrated to set condition, agitating the mix and mold during the feeding operation, drying said mold and contents, and firing the molded article in a non-oxidizing, atmosphere which with silicon will form a silicide.

References Cited in the file of this patent

UNITED STATES PATENTS

| | | |
|---|---|---|
| 1,694,563 | Ross et al. | Dec. 11, 1928 |
| 1,768,546 | Curtis | July 1, 1930 |
| 2,154,271 | Higgins | Apr. 11, 1939 |
| 2,601,373 | Dienel | June 24, 1952 |
| 2,609,318 | Swentzel | Sept. 2, 1952 |
| 2,624,932 | Sjogren | Jan. 13, 1953 |
| 2,636,826 | Nicholson | Apr. 28, 1953 |